May 8, 1945.   E. S. MacPHERSON   2,375,670

MOTOR VEHICLE

Filed Jan. 25, 1943    3 Sheets-Sheet 1

Inventor
Earle S. MacPherson
By
Blackmore, Spencer & Hunt
Attorneys

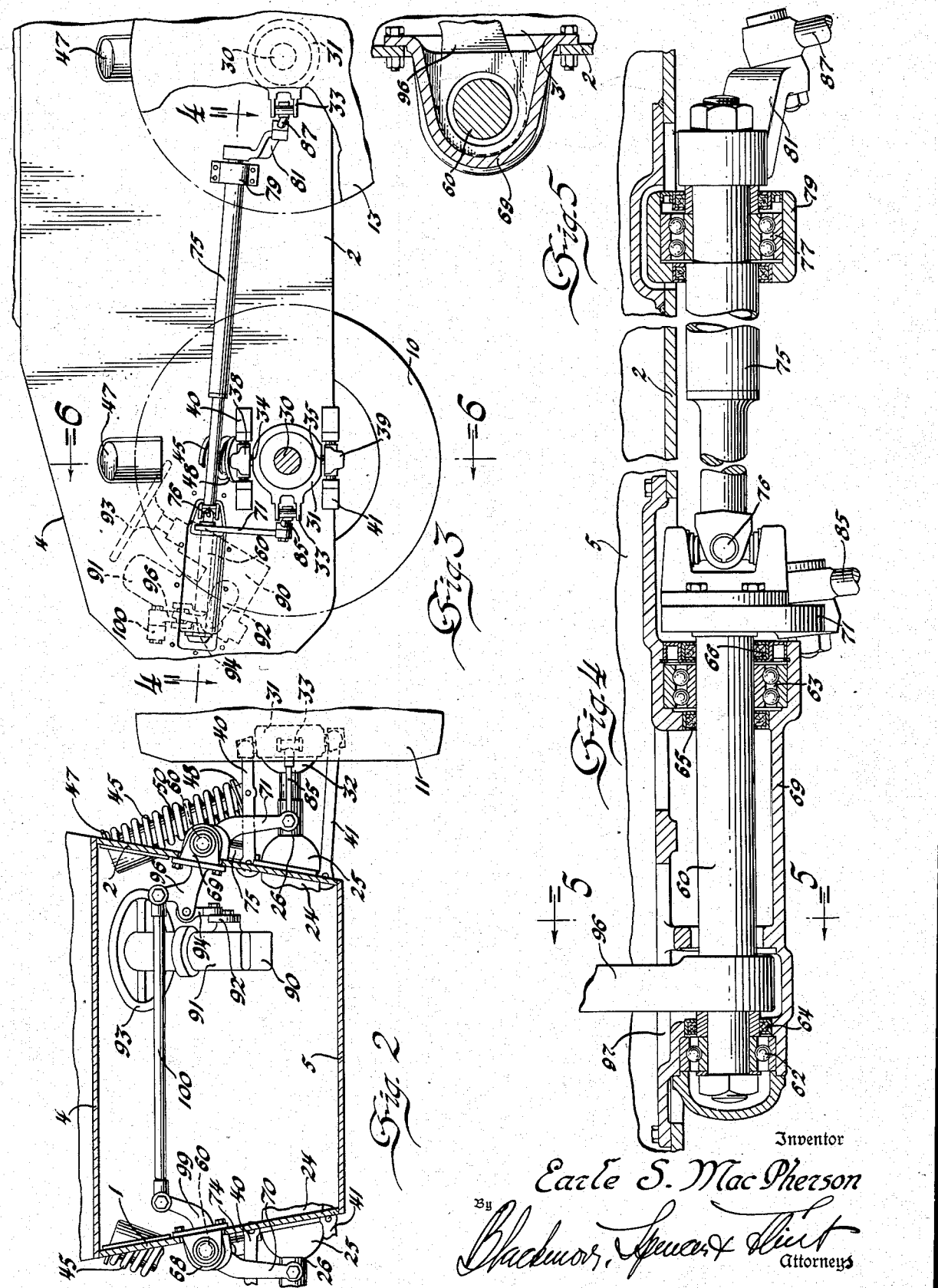

May 8, 1945. E. S. MacPHERSON 2,375,670
MOTOR VEHICLE
Filed Jan. 25, 1943 3 Sheets-Sheet 3

Inventor
Earle S. MacPherson
By Blackmore, Spencer & Flint
Attorneys

Patented May 8, 1945

2,375,670

UNITED STATES PATENT OFFICE 2,375,670

MOTOR VEHICLE

Earle S. MacPherson, Detroit, Mich., assignor to General Motors Corporation, Detroit, Mich., a corporation of Delaware Application January 25, 1943, Serial No. 473,512

5 Claims. (Cl. 180—24)

This invention relates to a motor vehicle with a body in the form of a hull capable of floating in water, or one which can at least be partially submerged, without water entering the interior of the body or hull.

More particularly, it relates to a six-wheel drive armored vehicle of the above kind with all wheels independently suspended on the exterior of the hull, outboard axle shafts for each wheel universally connected to drive shafts within the hull, and a suitable mechanism for steering the front and intermediate wheels simultaneously.

One object of the invention is a vehicle in which the body constitutes a hull which is easily and adequately sealed against the ingress of water in which it may be submerged, at those places where its driving and steering means essentially extend outside from the interior thereof.

Another object of the invention is a vehicle with steering mechanism for the dirigible wheel or wheels on one side of the vehicle connected to steering mechanism for the dirigible wheel or wheels on the other side of the vehicle by a cross connecting link situated within the hull of the vehicle.

The above and other objects of the invention will be apparent as the description proceeds.

According to the invention, the steering mechanism includes longitudinally disposed downwardly and rearwardly inclined shafts on each side of the vehicle which are turned by a steering gear of which the pitman arm is linked to a lever arm on one of the said shafts, linked to a lever arm on the other of said shafts by a cross connecting tie rod wholly within the hull of the vehicle. The shafts thus turned have lever arms linked respectively to the steering arms of the dirigible wheels on their respective sides of the vehicle.

The drawings show a construction with a steering mechanism according to the invention applied to the front and intermediate independently suspended wheels of a six wheel drive vehicle with an armored hull.

In the drawings:

Figure 2 is a view on line 2—2 of Figure 1.

Figure 3 is a view on line 3—3 of Figure 1.

Figure 4 is an enlarged sectional view on line 4—4 of Figure 3.

Figure 5 is a sectional view on line 5—5 of Figure 4.

Figure 1:
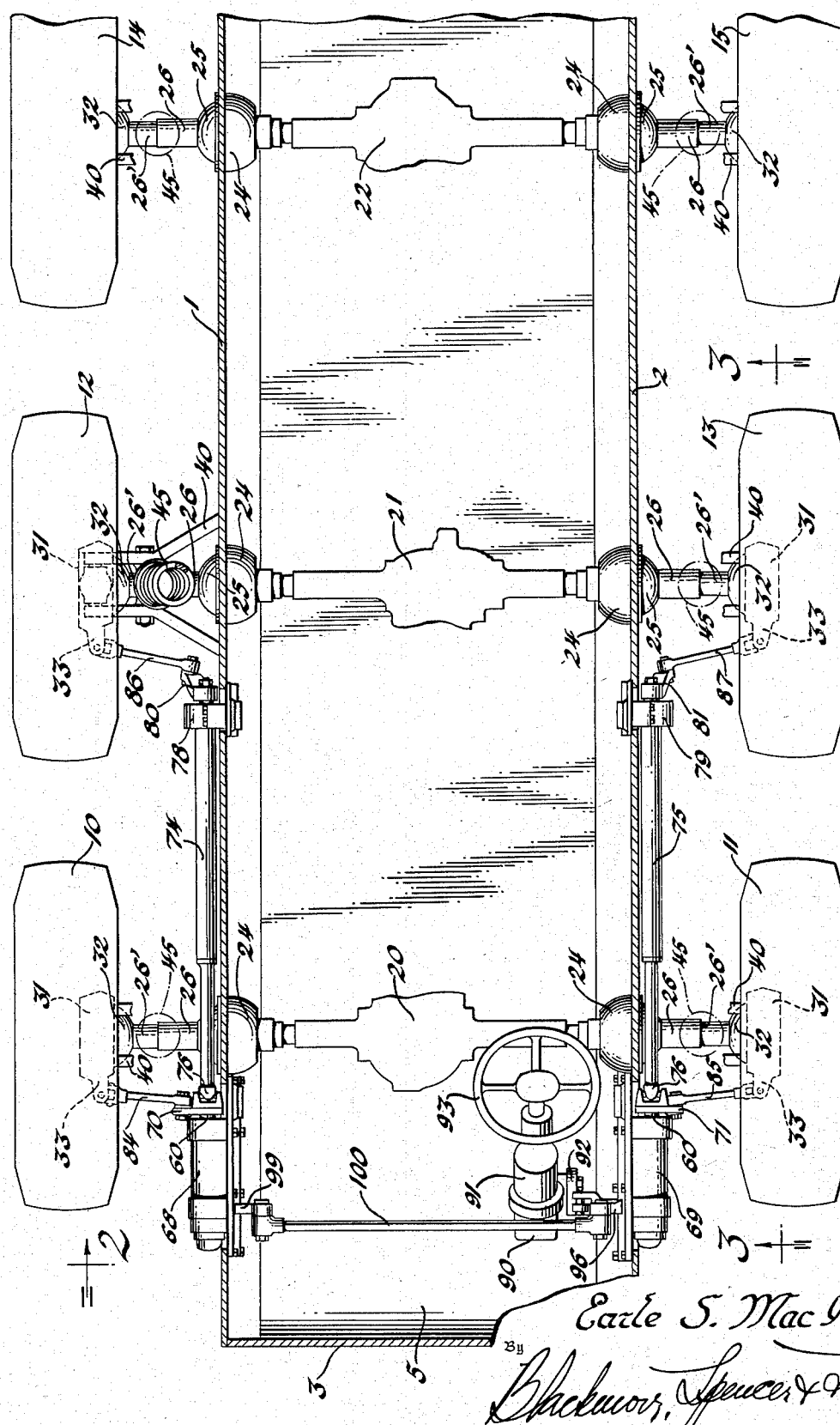
Figure 1 is a plan view of the steering mechanism and associated parts.

The vehicle includes a body of armor plate with sides 1 and 2 and ends such as 3, a top 4, and a bottom 5, forming a hull which is capable of floating in water, or one which can at least be partially submerged without water entering the interior of the body or hull. It has front dirigible wheels 10, 11, intermediate dirigible wheels 12, 13, and rear wheels 14, 15.

Figure 6:
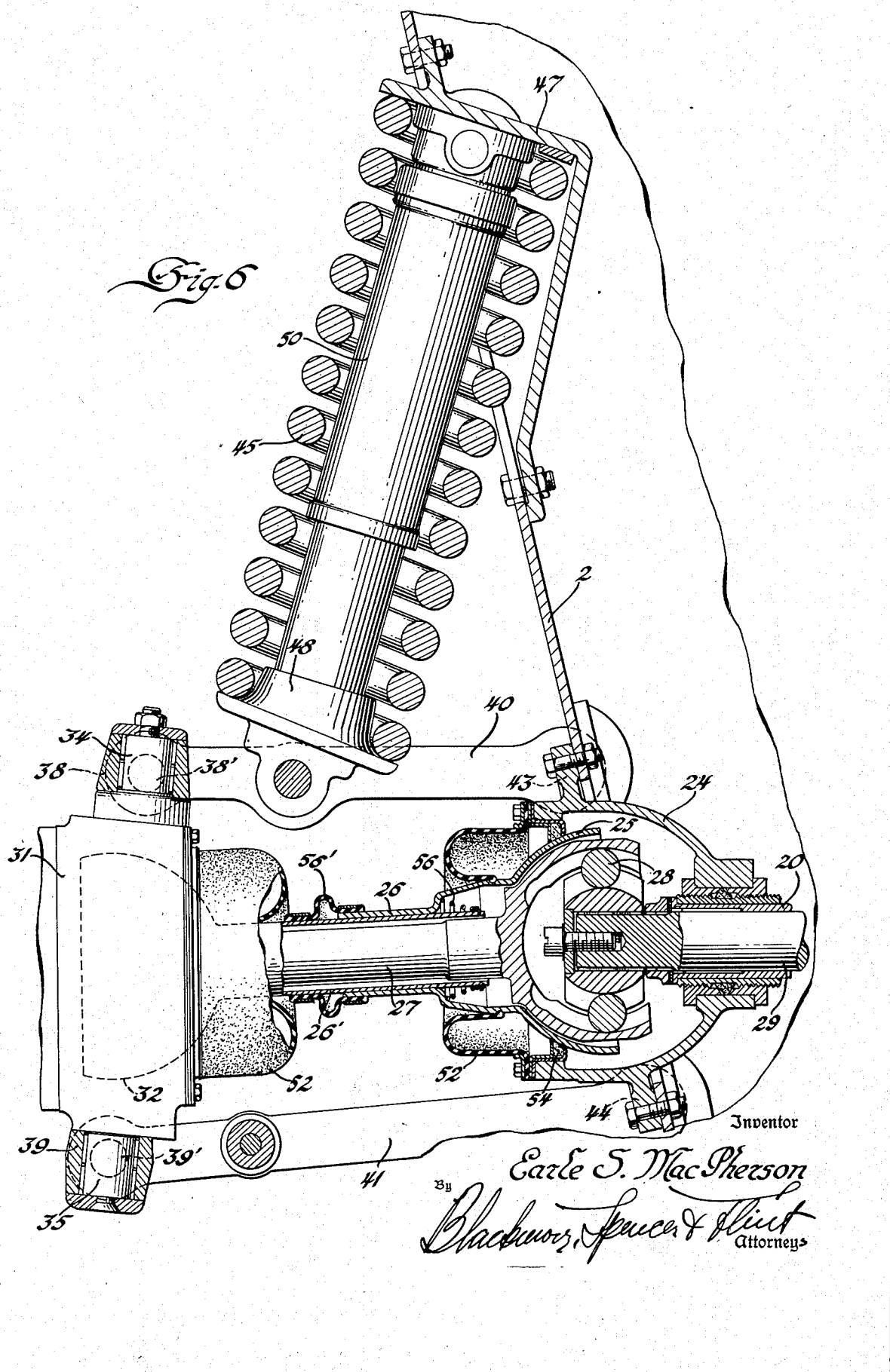
Figure 6 is a part sectional view on line 6—6 of Figure 3 showing the manner in which the wheels are independently suspended.

The body or hull is resiliently supported on the wheels which are each independently suspended therefrom by a wishbone suspension system of the kind shown most clearly in Figure 6, situated wholly on the outside of the hull.

Rigidly mounted within the hull are drive shaft housings 20, 21, and 22, one for each pair of road wheels. The housings 20, 21 and 22 have cupped ends forming sockets such as 24 secured to the sides 1 and 2 of the hull, to receive and seal the ball cupped ends 25 of telescopic non-rotating tubular housings such as 26 for outboard axle shafts such as 27 which are universally jointed as at 28 to their drive shafts such as 29 within the housings 20, 21 and 22 and are similarly jointed at their opposite ends (not shown) to the stub axles such as 30 (Figure 3) of their respective wheels.

The stub axles such as 30 to which the wheels are secured are mounted in suitable bearings in wheel supporting brackets such as 31 with sockets (not shown) which receive and seal the opposite ball cupped ends 32 of the inner sleeves 26' of the housings 26. They are each supported by independent suspension means of the kind shown in Figure 6.

In the case of the dirigible wheels 10, 11, and 12, 13, the brackets such as 31 are provided with steering arms 33 and are carried by trunnions 34 and 35 in knuckle brackets such as 38 and 39 (Figures 3 and 6) supported on pivot axes 38' and 39' at the ends of the upper and lower transverse wishbone links 40 and 41 respectively of their suspension systems. The trunnions 34 and 35 permit of the required steering movement of the wheels about substantially vertical axes.

As indicated in Figure 6, the upper and lower links 40 and 41 of the suspension systems are pivotally connected to the vehicle hull for swinging movement about substantially horizontal axes 43 and 44. Upward swinging movement thereof about these axes is resiliently resisted by coil springs such as 45 with their upper ends seating on abutments such as 47 on the hull side and their lower ends seating on seatings such as 48 pivotally connected to the upper links 40.

Within each of the coil springs 45 is a telescopic shock absorber 50 with its upper end pivotally connected to the abutment such as 47 and its lower end secured to the seating such as 48.

The ball cupped ends 25 of the housings 26 are enclosed within flexible seals such as 52 of rubber or the like and are supported and sealed in the sockets 24 by bearing seals such as 54. The ball cupped ends 32 of the inner sleeves 26' of the housings 26 are sealed and supported in a similar manner (not shown) in the wheel supporting brackets 31.

Springs such as 56 between the parts 26 and 26' of the tubular housings resiliently urge them into a telescoped position of minimum overall length with their cupped ends against their bearing seals such as 54 while the juncture of their telescoped positions is enclosed by an extensible or collapsible seal 56' of rubber or the like.

On the outside of each of the sides 1 and 2 of the hull there is a longitudinally disposed shaft such as 60, downwardly and rearwardly inclined to a point above and forward of the housings 26 for the outboard axle shafts of the front dirigible wheels 10, 11.

The shafts such as 60 are supported by ball bearings 62 and 63 with seals such as 64, 65 and 66 in housings 68 and 69 which are secured to the sides 1 and 2 respectively of the hull.

Downwardly extending lever arms 70 and 71 are secured to the respective ends of the shafts 60 which extend rearwardly from their housings and to which shaft extensions 74 and 75 are universally jointed at 76.

The shaft extensions 74 and 75 are approximately coaxial with their respective shafts 60 and extend to a point above and forward of the housings 26 for the outboard axle shafts of the intermediate dirigible wheels 12, 13. They are supported in a ball bearing such as 77 suitably sealed in housings 78 and 79 secured to the respective sides 1 and 2 of the hull, and downwardly extending lever arms 80 and 81 are secured to their rearward ends.

The lever arms 70 and 71 are linked by connecting rods 84 and 85 to the steering arms 33 of the front dirigible wheels 10 and 11 respectively, and the lever arms 80 and 81 are linked by connecting rods 86 and 87 to the steering arms 33 of the intermediate dirigible wheels 12 and 13 respectively.

Suitably mounted in the hull forwardlly of the front dirigible wheels 10, 11 is a steering gear 90 provided with hydraulic power servo means indicated generally at 91, which rocks a pitman arm 92 upon turning of a steering wheel 93.

The pitman arm 92 is connected by a link 94 or pitman steering connecting rod to a bell crank lever 96, which is secured to the shaft 60 in the housing 69 and extends through a port 97 in the side of the hull, upwardly therefrom into the interior of the hull. The shaft 60 in the housing 68 is provided with a lever 99 which similarly extends through a port in the opposite side of the hull, upwardly therefrom into the interior of the hull, and is linked to the lever 96 by a cross connecting tie rod 100.

It will be seen that through the link 94 and the levers 96 and 99 with their cross connecting tie rod 100, the shafts 60 on opposite sides of the hull are turned by the pitman arm 92 in a direction depending on the direction in which the steering wheel 93 is turned and that this movement is transferred into steering movement of the dirigible wheels 10, 11, and 12, 13 about their trunnions 34 and 35 through the lever arms 70, 71 with links 84, 85 to the steering arms 33 of the front dirigible wheels 10, 11 respectively, and through the lever arms 80, 81 with links 86, 87 to the steering arms 33 of the intermediate dirigible wheels 12, 13, respectively; the housings 68 and 69 with the seals such as 65, 66 effectively sealing the interior from the outside of the hull where the lever arms 96, 97 extend therethrough.

The downward rearward inclination of the shafts 60 with their extensions 75 facilitates the use of lever arms 80, 81 shorter in length than the lever arms 70, 71 as shown, and it will be appreciated that because of this the wheels 12, 13 will be turned through a desirable smaller steering angle than the wheels 10, 11.

I claim:

1. In a vehicle with a body in the form of a hull, road wheels with stub axles supported in bearings in brackets independently suspended from said hull on opposite sides of the vehicle, driving means for said road wheels, including drive shafts within the hull, and outboard axle shafts with their opposite ends respectively universally jointed to the drive shafts and the stub axles, and means for sealing said hull against the ingress of water in which it may be submerged at those places where the driving means extend through the hull, said means including housings for the outboard part of said driving means, the opposite ends of said housings having ball cupped ends respectively supported and sealed in sockets in said hull and said independently suspended brackets.

2. The combination according to claim 1, in which said driven road wheels are dirigible wheels provided with steering mechanism, including a pair of turnable steering shafts, one on the outside of each side of the vehicle hull and suitably supported in housings secured to the sides of said hull, lever arms on each of said steering shafts extending through ports in the side of the hull into the interior thereof, and means for moving said lever arms to turn said steering shafts; said housings sealing said hull against the ingress of water in which it may be submerged at those places where said lever arms extend through said ports.

3. In a vehicle with a pair of dirigible road wheels on opposite sides thereof, steering mechanism for said wheels including a steering gear with a pitman arm, a pair of shafts on opposite sides of said vehicle, a lever arm on each of said shafts, a cross connecting tie rod linking said lever arms together, a link from said pitman arm to one of said lever arms, a second lever arm on each of said shafts, and a link between each of said second lever arms and the wheel on its respective side of the vehicle, said shafts on opposite sides of the vehicle being supported in bearings with suitable seals in housings secured to the outside of the vehicle body, the steering gear, the pitman arm and the tie rod being wholly within the vehicle body, and said lever arms linked by said tie rod extending from their shafts through ports in the body sides into the interior of the body; said body constituting a hull sealed by said housings against the ingress of water in which it may be submerged, at those places where said lever arms extend through said ports.

4. In a vehicle with a pair of front dirigible road wheels, a second pair of dirigible road wheels behind the front dirigible road wheels, a pair of longitudinally disposed shafts suitably supported in bearings on opposite sides of said vehicle, a lever arm on each of said shafts, a steering gear, linkage between said steering gear and said lever arms for turning said shafts, and linkage for effecting dirigible movement of said wheels from said shafts, including a second lever arm on each of said shafts, a link between each of said second lever arms and the front wheel on its respective side of the vehicle, a third lever arm on extensions of each of said shafts, and a link between each of said third lever arms and the second wheel on its respective side of the vehicle, said longitudinally disposed shafts and their extensions being inclined downwardly and rearwardly above the plane of the axes of the wheels, and the third lever arms being shorter in length than the second lever arms, thereby turning the second pair of wheels through a smaller steering angle than the front wheels.

5. In a vehicle with a pair of front dirigible road wheels, a second pair of dirigible road wheels behind the front dirigible road wheels, a pair of longitudinally disposed shafts suitably supported in bearings on opposite sides of said vehicle, a lever arm on each of said shafts, a steering gear, linkage between said steering gear and said lever arms for turning said shafts, and linkage for effecting dirigible movement of said wheels from said shafts, including a second lever arm on each of said shafts, a link between each of said second lever arms and the front wheel on its respective side of the vehicle, a third lever arm on extensions of each of said shafts, and a link between each of said third lever arms and the second wheel on its respective side of the vehicle, there being a universal joint between each of said shafts and the extensions thereof, the ends of said extensions remote from their universal joints being supported in suitable bearings secured to the vehicle sides.

EARLE S. MACPHERSON.